UNITED STATES PATENT OFFICE.

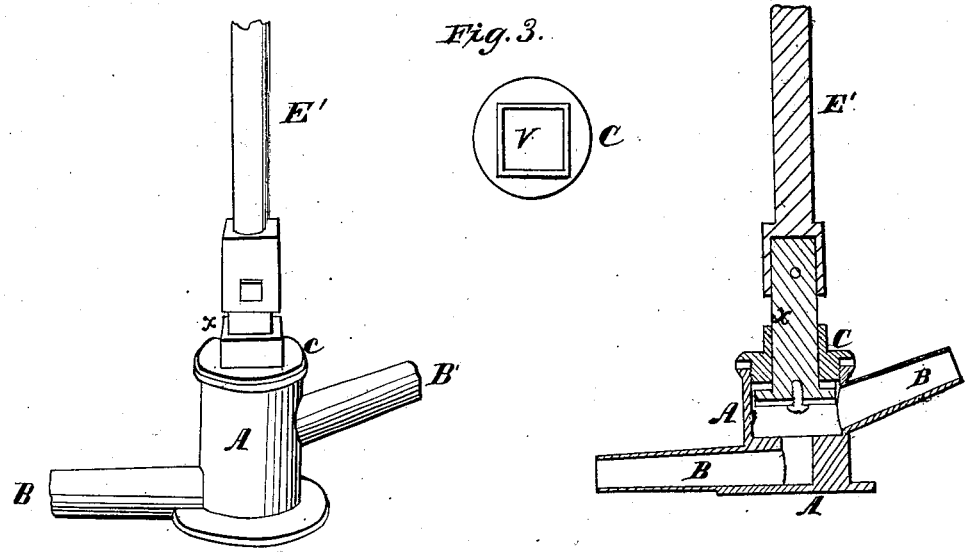
E. Hubball,
Hydrant Lock,
№ 2,086.          Patented May 11, 1841.

EBENEZER HUBBALL, OF BALTIMORE, MARYLAND.

CONSTRUCTION OF HYDRANT-COCKS.

Specification of Letters Patent No. 2,086, dated May 11, 1841.

*To all whom it may concern:*

Be it known that I, EBENEZER HUBBALL, of the city of Baltimore and State of Maryland, have invented a new and useful improvement upon the method of constructing cocks for hydrants or other purposes by producing a perpendicular lift of the piston for which Letters Patent of the United States were granted to me as assignee of Joseph Martin, dated on the 10th day of February, 1841, and that the following is a full and exact description of the construction and operation of said improvement, reference being had to the annexed drawing of the same, making a part of this specification.

Figure 1 is a side elevation. Fig. 2 is a vertical section. Fig. 3, top view of the male screw. Fig. 4, plan of the coupling G.

The nature of this improvement consists in making the hole in the male screw of the cock through which the piston enters the cock, square, or polygonal, with the piston corresponding therewith, where the piston passes through the screw cap, as hereafter described, so that by turning the top part of the hydrant described, the screw of the cock can be unscrewed and taken out along with the piston so as to permit the leather to be renewed and the piston and screw afterwards replaced, without removing the earth, or disturbing in any manner the hydrant in the ground—which will also enable any person to repair his hydrant himself without the aid of a hydrant maker.

The upper portion J of the hydrant is made like that described in the patent referred to except in the particular which will be described, for instance the cap D, piston rod E and male screw L on the upper end of the same—female screw or nut P and handle H for turning the same are made like those described in the former patent. The exception mentioned is in making parallel vertical tongues or wings W on the sides of the piston rod which work in corresponding grooves Y in the coupling G of the top or stock I to prevent the rod from turning horizontally and at the same time to allow it to rise and fall vertically.

The main improvement however consists as before stated in the construction of the cock A, the head or cap C of which being made with a male screw, around its circumference to screw into a female screw in the inside of the upper end of cylinder A of the cock, in which head or cap is made a square, polygonal or other shaped aperture V through which the piston X of corresponding shape passes, being thus formed to prevent its turning horizontally, while unscrewing the cap C of the cock to withdraw the piston for repair or other purpose without disturbing the cock or the earth surrounding it.

Now what I claim as my invention, and which I desire to secure by Letters Patent is—

The making of the hole in the screw C through which the piston X enters the cock A square or polygonal in the piston corresponding therewith, where the piston passes through the screw as above described, so that by turning the stock or top I the screw C can be unscrewed, and taken out along with the piston so as to permit the leather to be renewed and the piston and screw afterward replaced without removing the earth or disturbing in any manner the hydrant in the ground—and although I make use of the terms square and polygonal I would conceive my patent infringed by the use of any shape of piston and opening in the screw, whereby the same power to unscrew and screw in again without disturbing the hydrant would be obtained.

EBENZR. HUBBALL.

Witnesses:
 WM. P. ELLIOT,
 THOS. H. DEWITT.